(12) United States Patent
Robertson (10) Patent No.: US 6,627,860 B1
(45) Date of Patent: Sep. 30, 2003

(54) SYSTEM AND METHOD OF TEMPERATURE MANAGEMENT FOR SEMICONDUCTOR MATERIAL PROCESSING

(76) Inventor: Gary Robertson, 12 Castle Wemyss Drive, Wemyss Bay, Refrewshire Scottland (GB)

( * ) Notice: Subject to any disclaimer, the term of this patent is extended or adjusted under 35 U.S.C. 154(b) by 118 days.

(21) Appl. No.: 10/007,336

(22) Filed: Nov. 8, 2001

(51) Int. Cl.[7] .................................................. H05B 1/02
(52) U.S. Cl. ........................ 219/506; 219/497; 219/501
(58) Field of Search .............................. 219/475, 481, 219/482, 490, 494, 497, 501, 502, 506, 507, 509, 510, 390, 411; 374/121, 128, 137; 250/341.1; 257/21.528; 118/729; 392/416

(56) References Cited

U.S. PATENT DOCUMENTS

| | | | | |
|---|---|---|---|---|
| 4,496,940 A | * | 1/1985 | Christel, Jr. ................ | 219/506 |
| 4,937,434 A | * | 6/1990 | Nakao ......................... | 219/390 |
| 5,616,264 A | * | 4/1997 | Nishi et al. .................. | 219/494 |
| 5,895,596 A | * | 4/1999 | Stoddard et al. ............. | 219/497 |

* cited by examiner

*Primary Examiner*—Tu Ba Hoang (57) ABSTRACT

A heat sensing device manager system and method for processing signals from heat sensing devices used to monitor the semiconductor processing environment. The system includes a circuit for determining if a heat sensing device has failed. Where a heat sensing device has failed the system can switch control of the system such that it relies on signals generated by operational heat sensing devices. The system also provides the user with an intuitive LED interface that provides the user with information regarding the operation of the heat sensing elements of the system, and where a heat sensing device has failed the user interface can convey information regarding the nature of a particular heat sensing device failure.

17 Claims, 14 Drawing Sheets

FIG. 7B ized view of a prior art diffusion
SYSTEM AND METHOD OF TEMPERATURE MANAGEMENT FOR SEMICONDUCTOR MATERIAL PROCESSING

TECHNICAL FIELD

The invention relates to the field of monitoring temperature for a diffusion furnace used in the processing of semiconductor material.

BACKGROUND OF THE INVENTION

Figure 1:
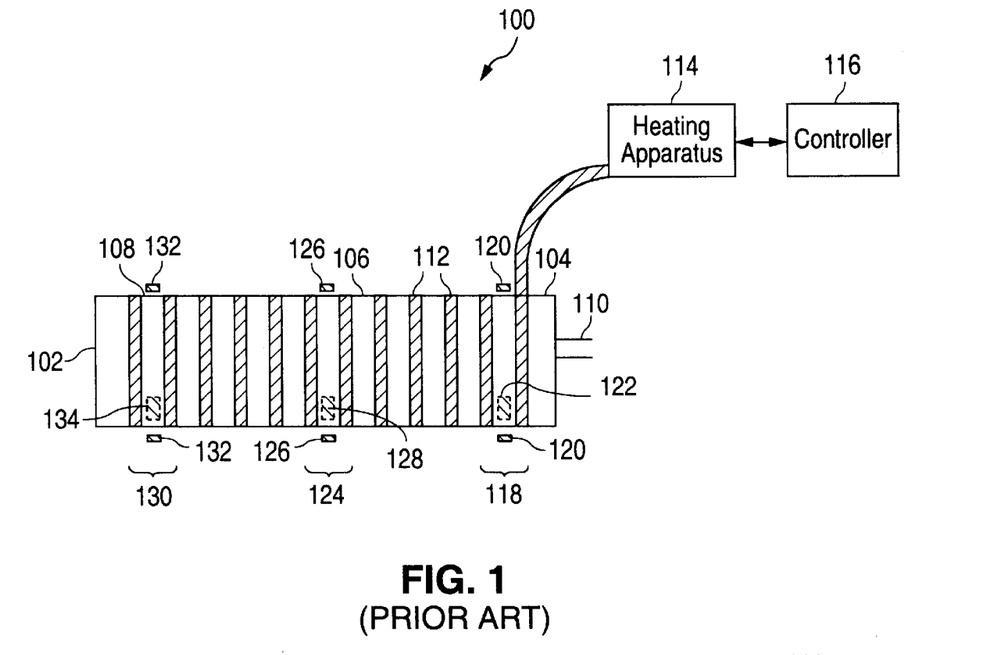
FIG. 1 is a simplified view of the of the diffusion furnace system of the prior art.

FIG. 1 shows a simplified view of a prior art diffusion furnace system used for processing semiconductor materials. The furnace 100 includes a cylindrical container 102 having a source area 104, a center area 106 and a handle area 108. Typically silicon wafers are positioned in the cylinder and gases are injected into the cylinder at the source end 110 of the container. A heating element 112, which consists of a coil wrapped around the outside of the container 102 is used to heat the container 102 and its contents. A heating apparatus 114 is used to heat the coil 112. A controller 116 is used to monitor the temperature of the container 102 and control the heating apparatus 114 driving the coils 112. For the processing of the semiconductor material inside the container 102 to be effective the temperature must be precisely controlled. Thus, the temperature of the container 102 must be accurately monitored.

The prior art system has three temperature monitoring zones 118, 124 and 130 which are disposed in the source area 104, the center area 106, and the handle area 108, respectively. The source zone 118 includes three thermocouples positioned in the source area 104 of the container. Two of the thermocouples 120 are referred to as spike thermocouples. As shown the spike thermocouples 120 are located outside of the container 102 on opposite sides of the container 102 and positioned between adjacent windings of the heating element coil 112. In practice however the spike thermocouples may be positioned adjacent to each other. The third thermocouple 122 in the source zone 118 is located inside the container 102, and is referred to as the profile thermocouple. In a similar manner the center monitoring zone 124 has two spike thermocouples 126 positioned on the outside surface of the container 102, between adjacent windings of the coil 112, and profile thermocouple 128 positioned inside the container 102. In a similar manner, a handle monitoring zone 130 is created in the handle area 108. The handle zone 130 includes two spike thermocouples 132 and a profile thermocouple 134.

A thermocouple is a heat sensing device which consists of dissimilar metals which are joined together. Other heat sensing devices which operate in manner similar to a thermocouple could also be used. The junction between the metals of the thermocouple is such that when it is exposed to heat it will generate a voltage. The more heat the thermocouple is exposed to the higher the resulting voltage. Conversely, as the temperature is lowered the voltage will decrease. In the prior system 100, the thermocouples are coupled to a controller 116 which operates to sense the voltage for each of the thermocouples. If the voltage of the thermocouples falls below a certain threshold then the power driving coil 112 will be increased by the heating apparatus 114, in response to signals from the controller 116. If the voltage of the thermocouples exceeds a certain threshold then the controller 116 will cause the heating apparatus to decrease the power driving the coil 112, thereby decreasing the generated heat sensed by the thermocouples.

In the prior art system 100, a problem can arise when one of the thermocouples fails. Typical failures for a thermocouple are manifested in one of two ways. A thermocouple may fail to generate a voltage in response to heat. In this case the thermocouple essentially shorts out. In this situation, even if the thermocouple is exposed to a very high temperature, it will fail to generate a voltage.

A thermocouple can also fail by going to a state where it becomes an open circuit. In this situation even when the thermocouple is exposed to very little heat it will appear to be generating a high voltage relative to a thermocouple that has not failed due to an open condition.

If the thermocouple has a short failure then the controller 116, detecting a very low voltage at the thermocouple, will process this detection as if the thermocouple were generating too little voltage as a result of the temperature being to low. Accordingly, the controller 116 will cause the heating apparatus 114 to drive the coil 112 to generate higher temperatures. Thus, increasing the temperature of the container 102. When there is a short failure, the controller 116 will frequently cause the heating apparatus 114 to drive the coil 112 to increase temperature above desired levels, which can result in a failed process.

If one of the thermocouples has an open failure, the controller 116 will sense what appears to be a very high voltage, which would lead to less power being used to drive the coil 112. In prior systems the thermocouple with the lower voltage was deemed to be the one on which the controller would base the control of the heating apparatus. As a result it was not uncommon to see a processes fail as a result of being overheated, where one of the thermocouples had to short failure. Further, these prior systems did not provide any easy way for a user to detect when a thermocouple failed due to a short condition.

In these prior systems, when a thermocouple failed because it was in an open condition, the operation of the furnace would likely continue successfully for a time, until a second thermocouple failed, at which point, the system operation could fail. If the second thermocouple failed as result of being open, then the controller 116 would allow the temperature to drop to low. If the second thermocouple failed as short then the system operation would fail as result to the temperature being driven to high. What is needed is a system which provides a simple and intuitive user interface which alerts a user if a thermocouple fails, and which makes optimum use of the thermocouples to increase the probability that the processing of the semiconductor material in the diffusion chamber will be successful.

SUMMARY

The heat sensing device manager system and method provided herein, offer the advantage of detecting whether a heat sensing device has failed due to an open condition or a short condition. In particular when a device is determined to have failed due to a short condition, the heat sensing manager system and method will cause the controller to not use the signal from the shorted heat sensing device as a basis for controlling the heating apparatus of the system. In addition, an embodiment of the system can provide a very simple LED user interface that conveys information about the operation of the heat sensing devices of the system. In particular the user interface can indicate which, if any, of the plurality of heat sensing devices have failed, and whether a failure of the heat sensing device is due to an open condition or a short condition.

DETAILED DESCRIPTION

Figure 2:
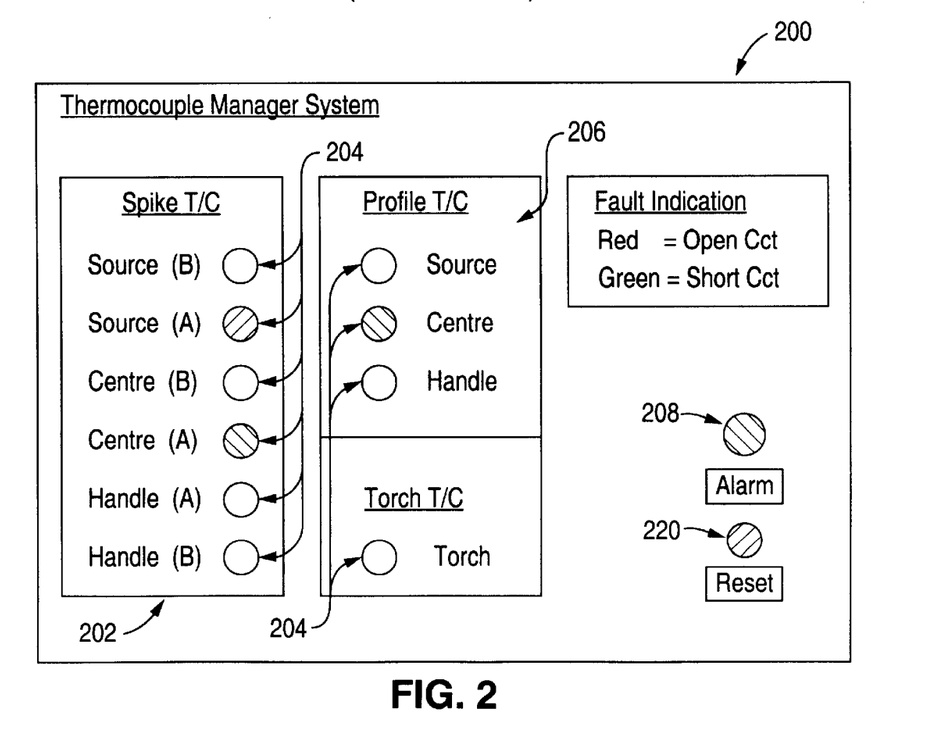
FIG. 2 is a view of a LED user interface of the invention.

A thermocouple manager system and method have been developed which can be used in conjunction with prior art systems as shown in FIG. 1. Specifically, the thermocouple manager system can be designed to interface with the existing temperature control systems of the prior art. In one embodiment the thermocouple manager system has a user interface 200 as shown in FIG. 2. The user interface includes LEDs 204 which corresponds to the different thermocouples described above. As shown there is a first area "Spike T/C" 202 where information is shown for the spike thermocouples. As discussed in more detail below, the operation of the interface is such that if an open circuit condition is sensed for the one of the spike thermocouples, which is identified as Source (A), then a red LED will light for the Source (A) LED. Similarly, if a short circuit condition is detected for the Center spike thermocouple (referred to as Centre (A) on the interface) then a green LED will light for the Center (A) LED. For the profile thermocouples, note that there is only one thermocouple per zone, the LEDs operate in similar manner. As shown in FIG. 2, in the "Profile T/C" area 206, a green LED is lit for the center profile thermocouple indicating a short failure. The torch LED can also be used to indicate information regarding the torch, which is an optional element of the heating apparatus. The interface 200 also provides a blue fault LED 208 which lights and latches when a fault is detected, and an audible alarm sounder can also be activated. The reset button 220 is available to reset the thermocouple manager system.

Figure 3:
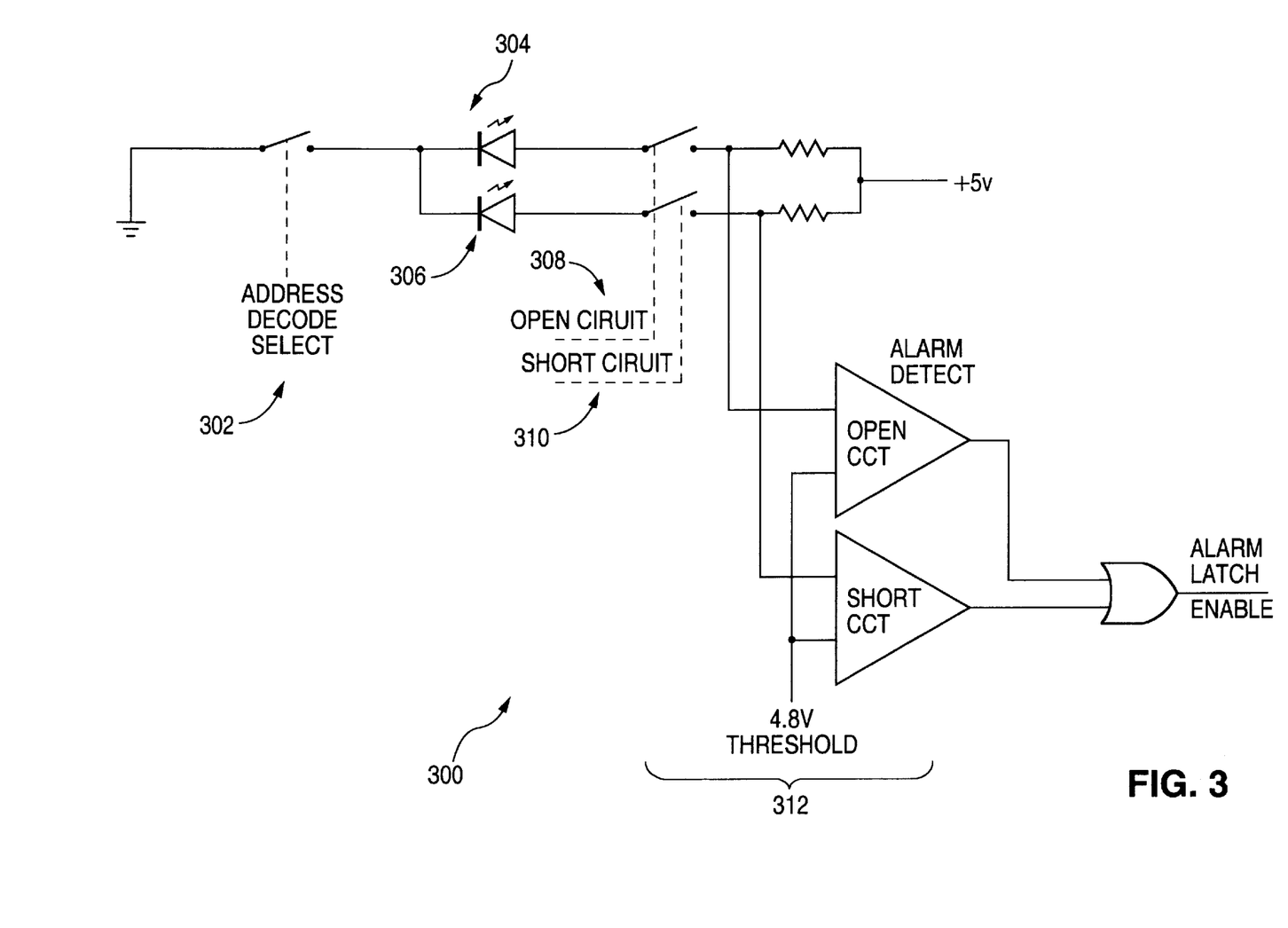
FIG. 3 is a functional diagram of a portion of the thermocouple manager system.

A simplified operational diagram of a portion of the thermocouple manager system 300 is shown in FIG. 3. Address decode/select circuitry 302 is used to identify which thermocouple voltage is being detected. When a voltage is detected that indicates that a particular thermocouple has failed due to an open or short condition, either a red LED 304 or a green LED 306 corresponding to the failed led will be lit by closing either the open circuit fault detect switch 308 or the short circuit fault detect switch 310. Upon the closing either of these switches a signal will also be sent to the alarm detect circuitry 312.

FIGS. 4A–4B to FIGS. 7A–7B show a detailed embodiment of a thermocouple manager system circuit. In this embodiment the circuitry can be thought of in two parts. One part is primarily analog (shown in FIGS. 4A–4B) and can be directly connected via a ribbon cable 414 to a control board, which is part of the prior art controller 116 shown in FIG. 1. The analog circuitry 400 can utilize signals from existing control boards of the controller 116 to detect the voltages generated by the different thermocouples.

Figure 4A:
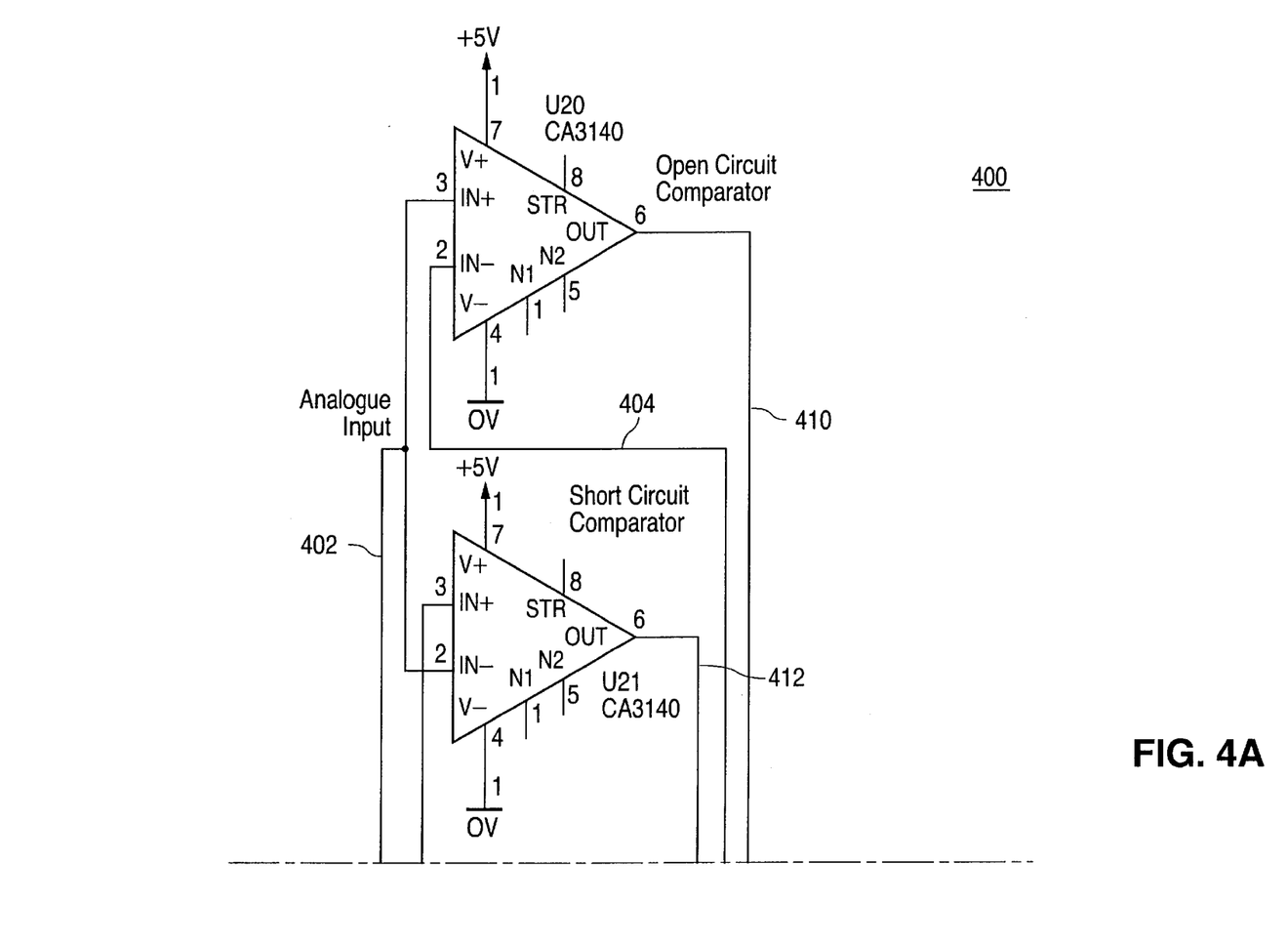
FIGS. 4A–4B are detailed schematics of a portion of the circuitry which embodies the thermocouple manager system.
Figure 4B:
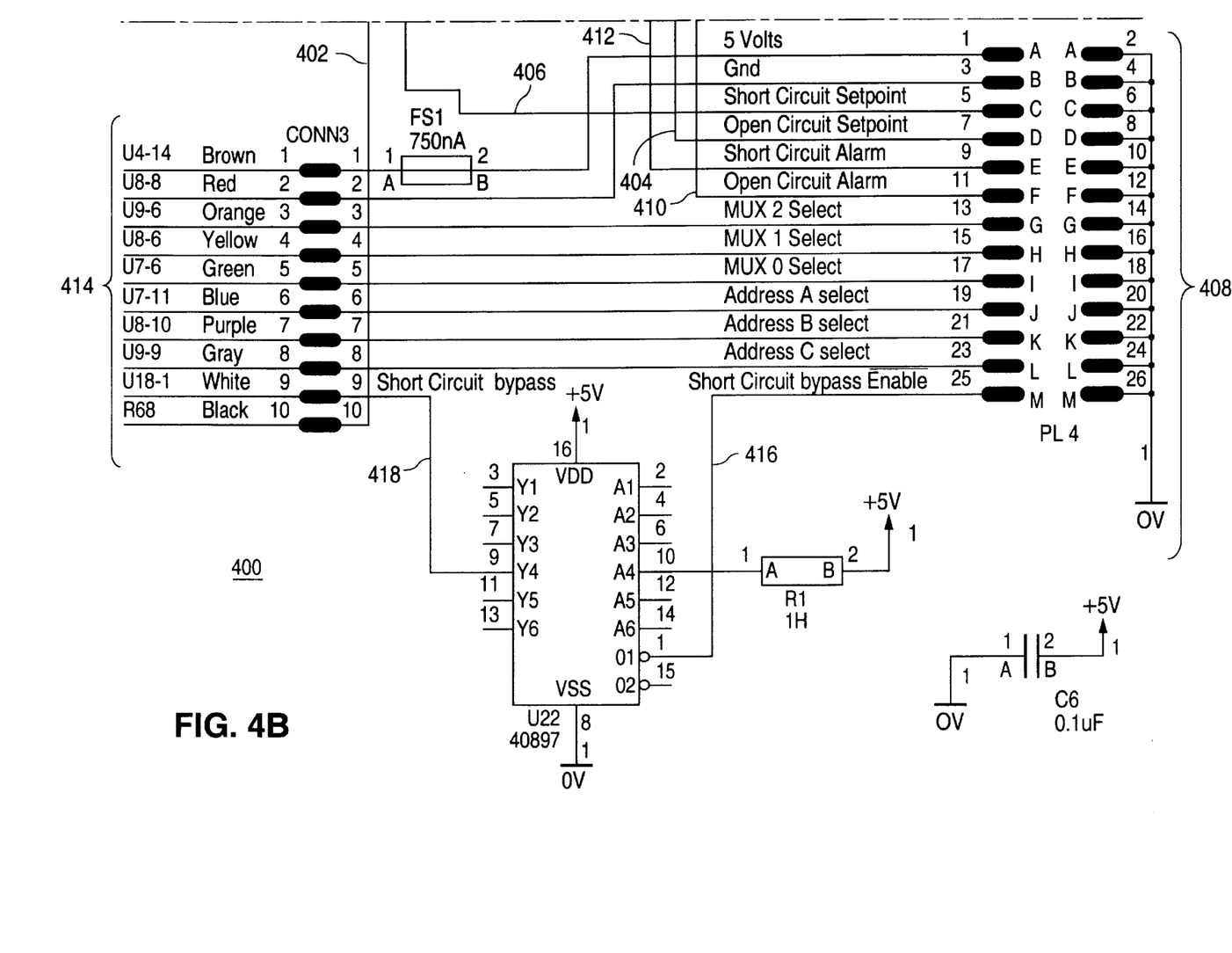

In one embodiment the circuitry 400 shown in FIGS. 4A–4B is implemented on a printed circuit board (PCB), and relevant control and power signals are derived from the existing temperature control circuitry of the controller 116. In some cases it is beneficial to enclose the circuitry 400 in a RF protection casing to prevent noise.

Figure 5A:
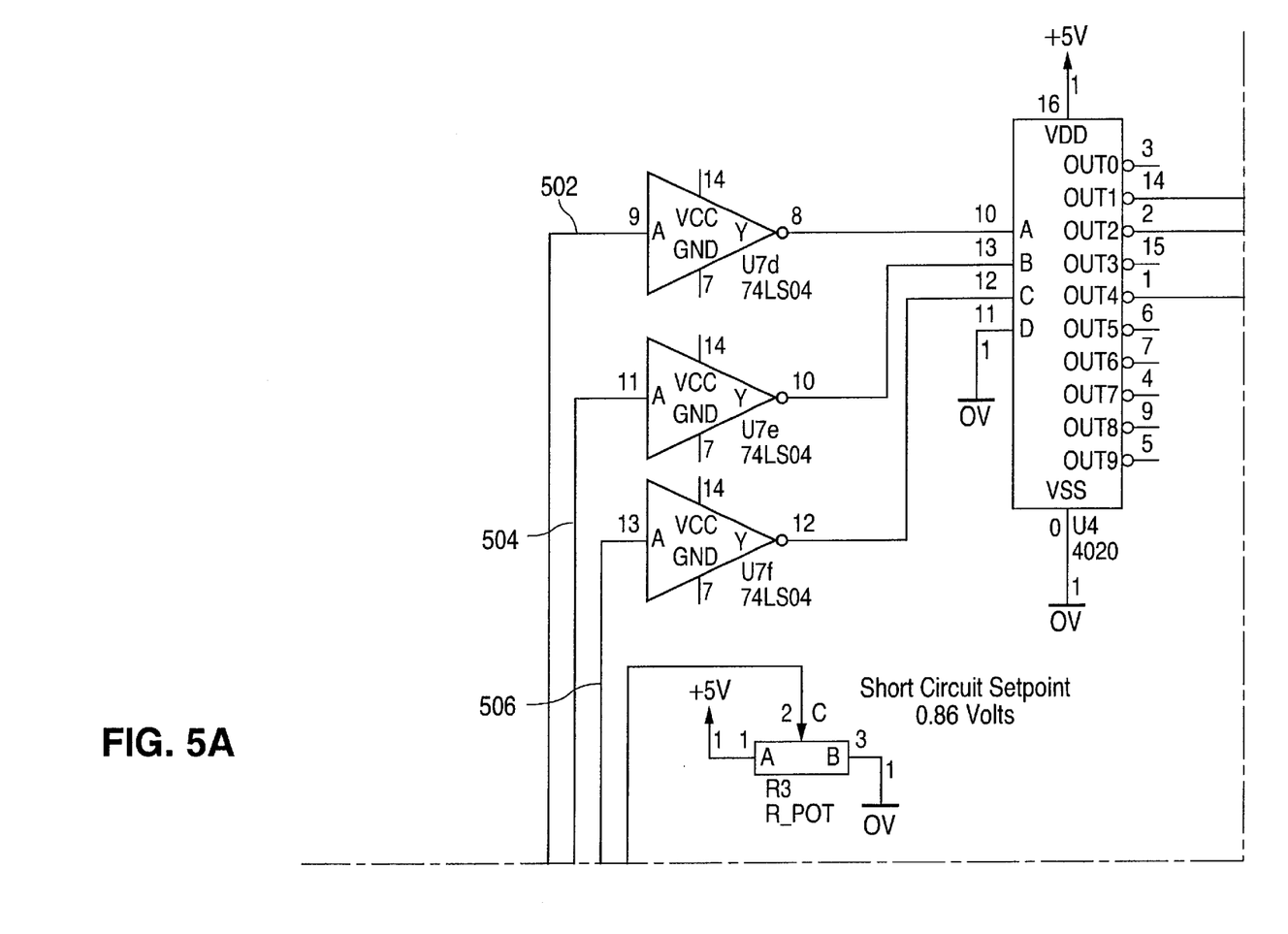
FIGS. 5A–5D are detailed schematics of a portion of the circuitry which embodies the thermocouple manager system.
Figure 5B:
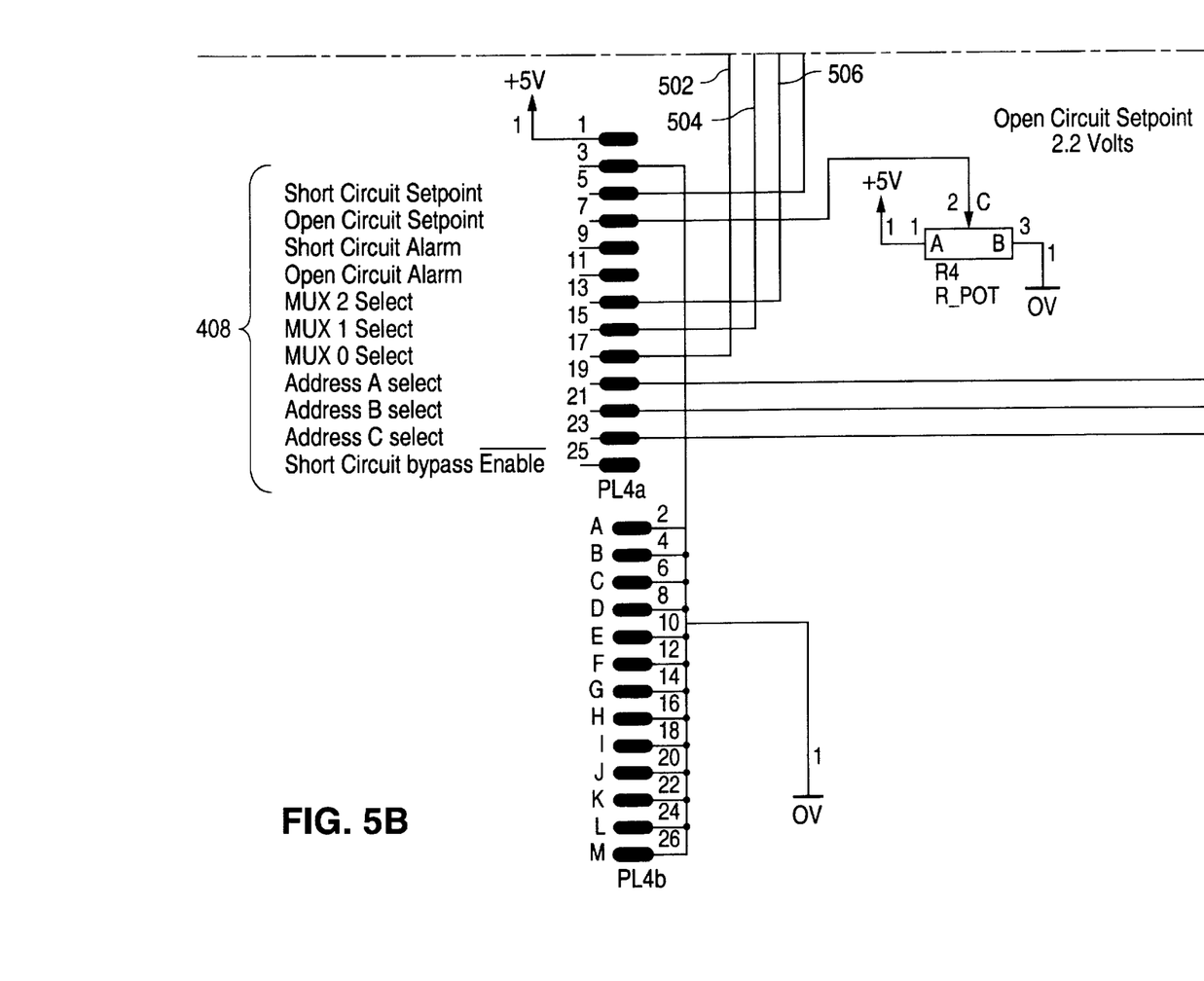

The comparators U20 and U21 of FIG. 4A, form a window comparator circuit which monitors the value of the analog voltage 402 detected at the thermocouples. The voltages at the different thermocouples are sequentially input to the window comparator circuit. The comparators operate to detect if either an open circuit or short circuit thermocouple condition is present. The window comparator threshold voltages 404 and 406 are provided by R3 and R4 shown in FIGS. 5A–5B. As shown in FIGS. 5A–5B the short circuit threshold voltage is 0.06 volts and the open circuit threshold voltage is 2.2 volts. When a thermocouple failure is present the relevant comparator, U20 or U21 of the window comparator, output voltage changes state and outputs 410 and 412 are transmitted to the circuitry shown in FIGS. 6A–6D.

FIGS. 5A–5D to FIGS. 7A–7B show the primarily digital circuitry of the thermocouple manager 300. This circuitry can be implemented on a PCB which is located remotely from the circuitry shown in FIGS. 4A–4B. The power and control signals are transferred from the analog PCB 400 to the digital control circuitry shown in FIGS. 5A–5D to FIGS. 7A–7B via a 26-way ribbon cable 408. The fact that these threshold resistors R3 and R4 are remotely located from the analog PCB board 400 can simplify the set-point adjustment for threshold voltages 404 and 406.

The analog PCB 400 provides a voltage injection 418 to the prior art controller 116 via a tri-state buffer U22. The short circuit bypass enable signal 416 switches the tri-state buffer U22 on and raises the 'short circuit bypass" voltage 418 to 5 volts via R1 pull up resistor. This signal 'fools' the prior art controller 116, by sending a signal 418 which makes the prior art controller 116 operate as if the shorted thermocouple is actually an open thermocouple. Thus, the controller 116 will operate to control the heating apparatus 114 based on a signal which corresponds to the thermocouple which is not shorted. This prevents the uncontrolled thermal runaway condition which short circuit thermocouples can initiate. (As previously discussed the prior art controller 116 operates to control the heating apparatus based the information generated by the thermocouple which corresponds to the lowest apparent detected temperature.)

Figure 5C:
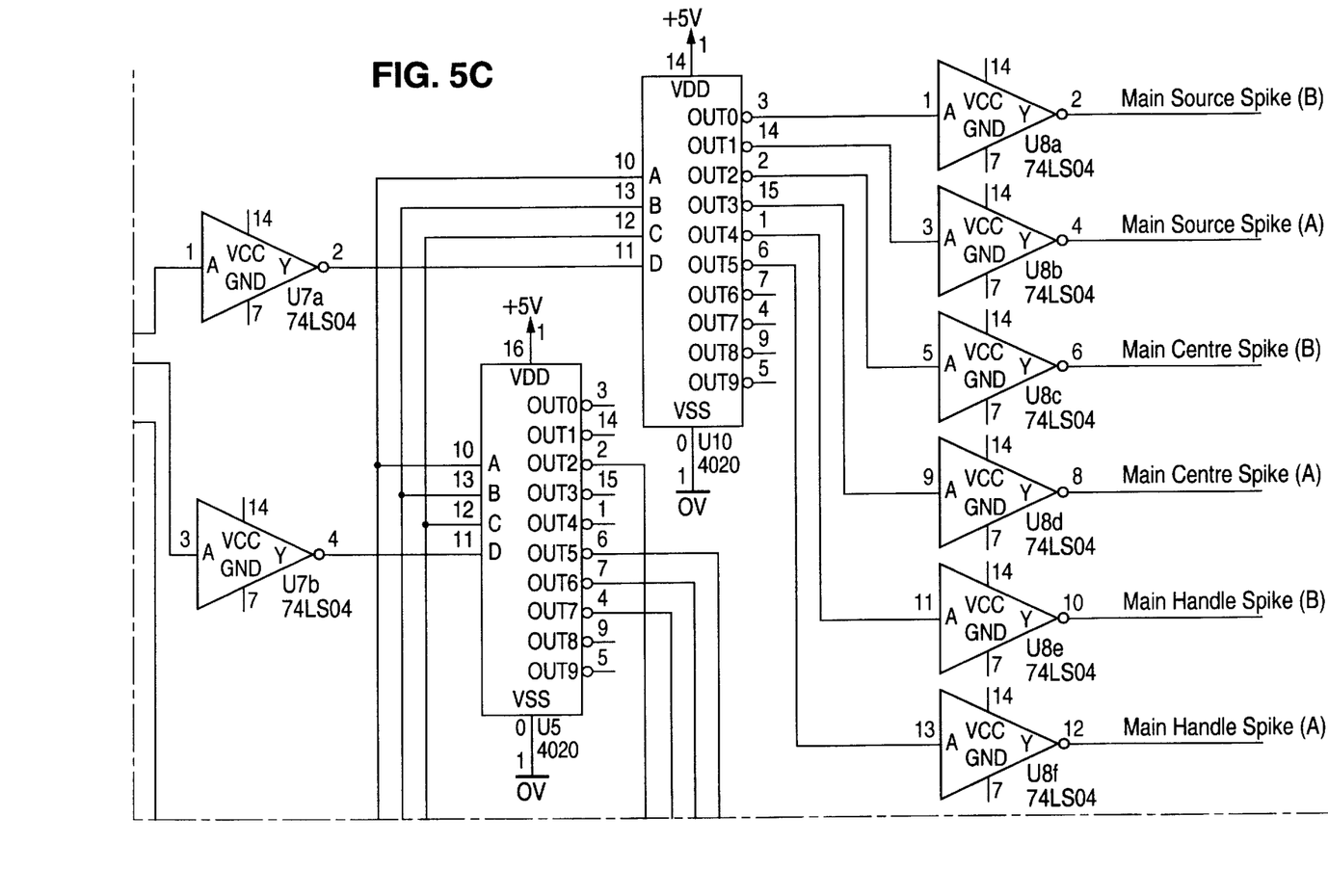
Figure 5D:
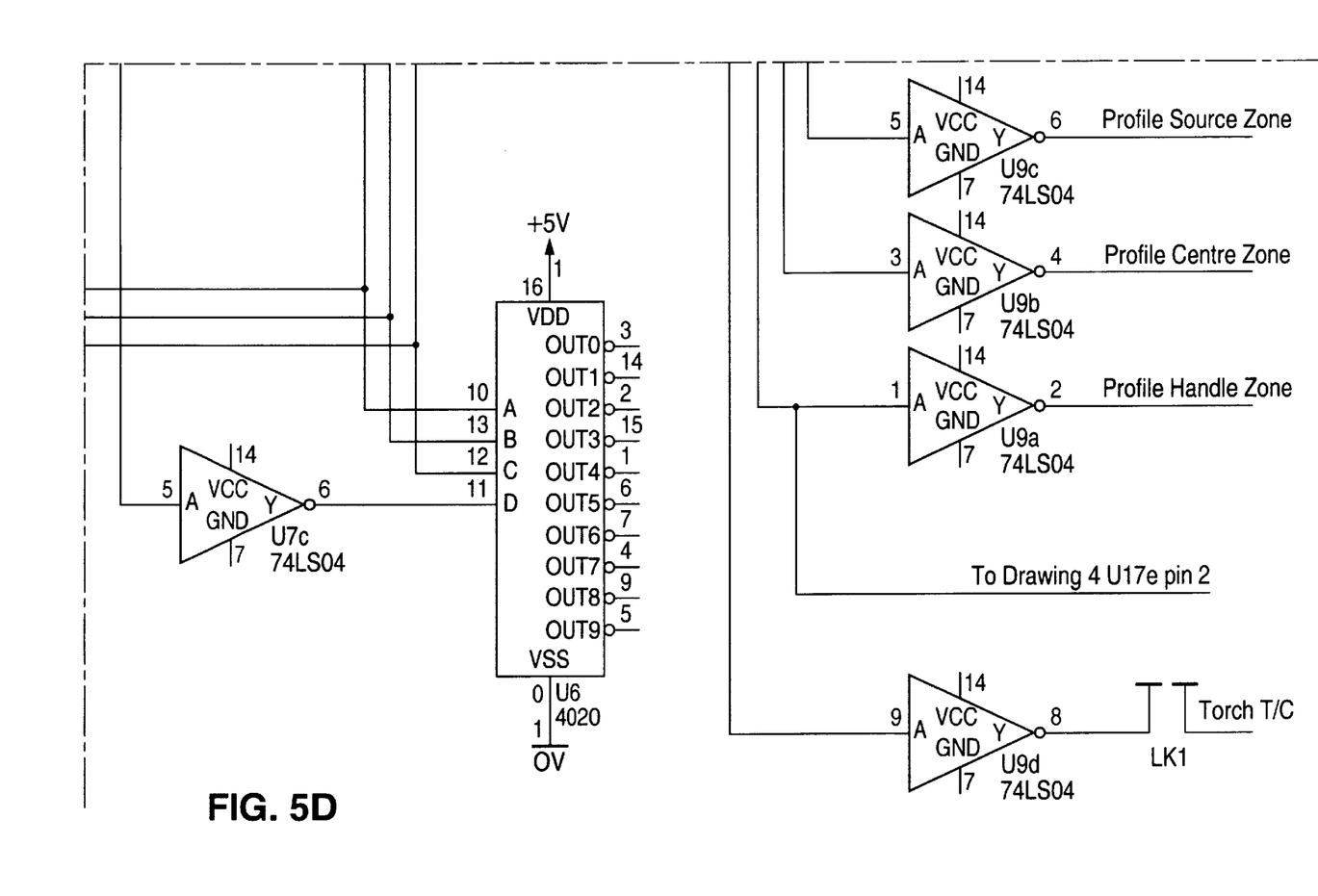

U4, U5, U6 and U10 shown in FIGS. 5A, 5C and 5D perform address decoding based on signals 502, 504 and 506 from a negative edge triggered control board thermocouple multiplexer circuit of a control board of the controller 116. The U7 inverters convert the negative edge triggered signals 502, 504 and 506 to positive edge triggered signals suitable for address decoding. The output of the U4 BCD to decimal decoder is fed to U5, U6 and U10 BCD to decimal decoders to provide ten thermocouple channel select signals; six for the spike thermocouples, and three for the profile thermocouples; and one for the torch thermocouple. These outputs are shown as lines from U5, U6 and U10 to inverters U8(a–f) and U9(a–d). The inverters operate to invert the signals and provide ground potential signals for a user interface circuit 600. The output from the inverters U8(a–f) and U9(a–d) are labeled to show the corresponding thermocouple.

Figure 6A:
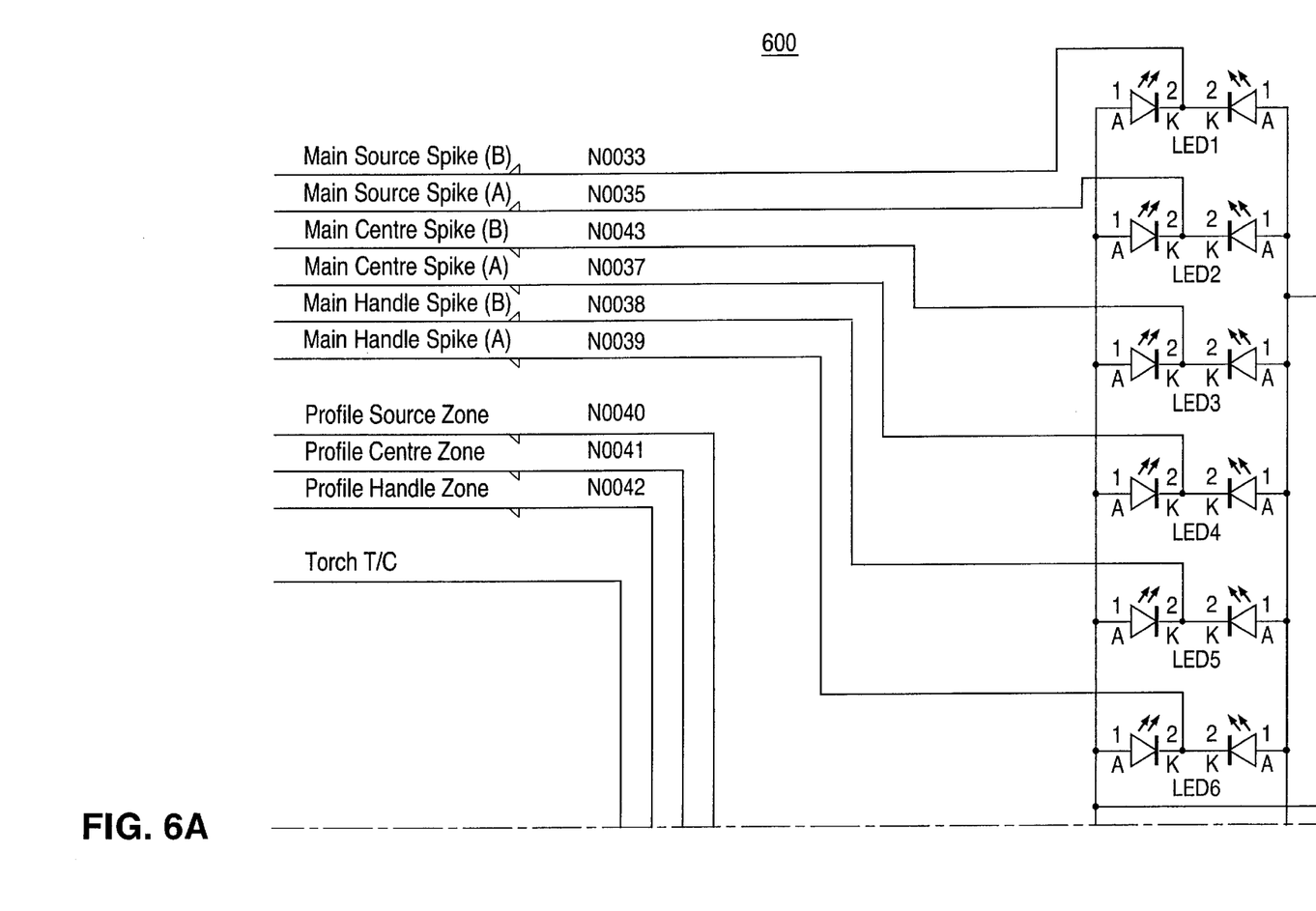
FIGS. 6A–6D are detailed schematics of a portion of the circuitry which embodies the thermocouple manager system.
Figure 6B:
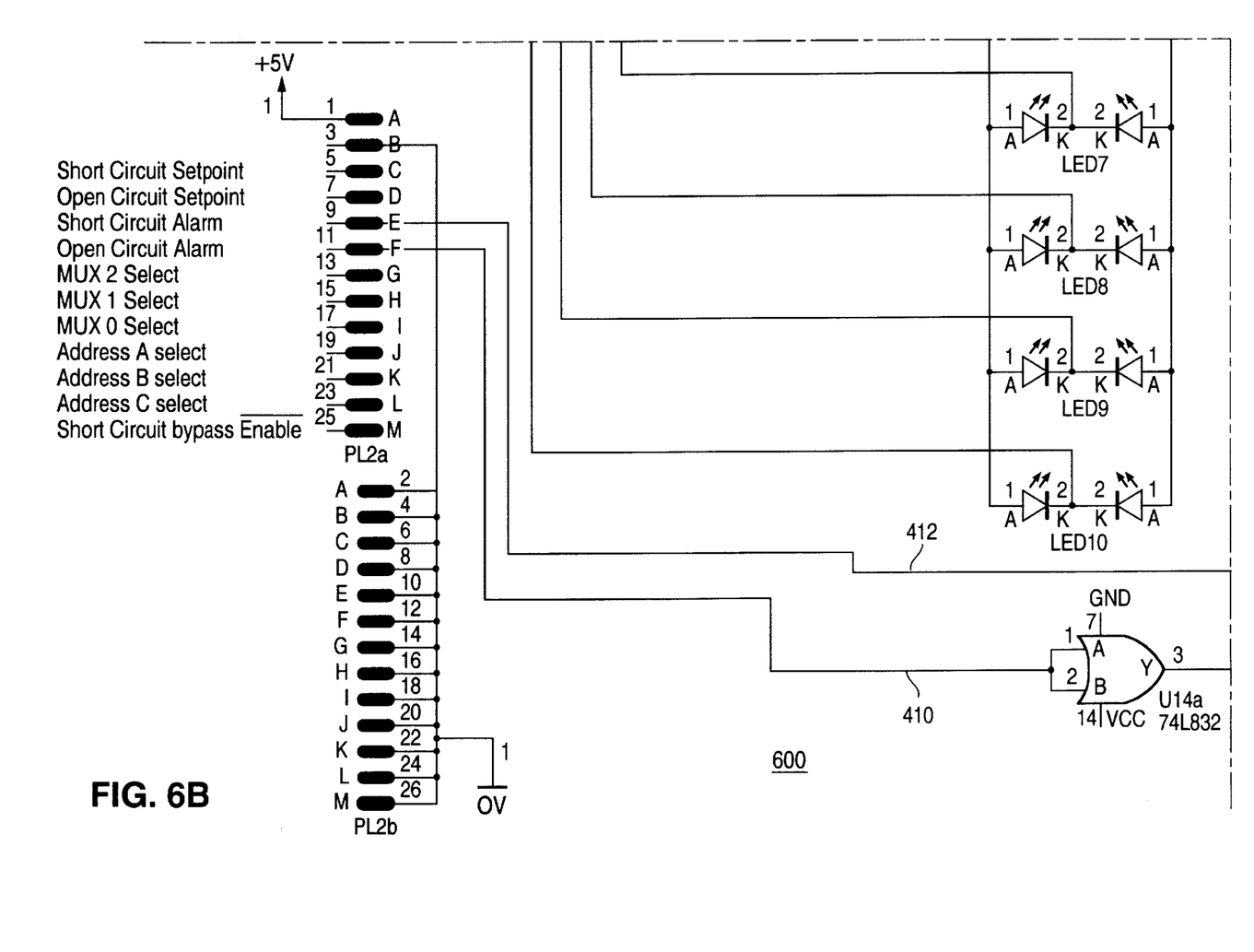
Figure 6C:
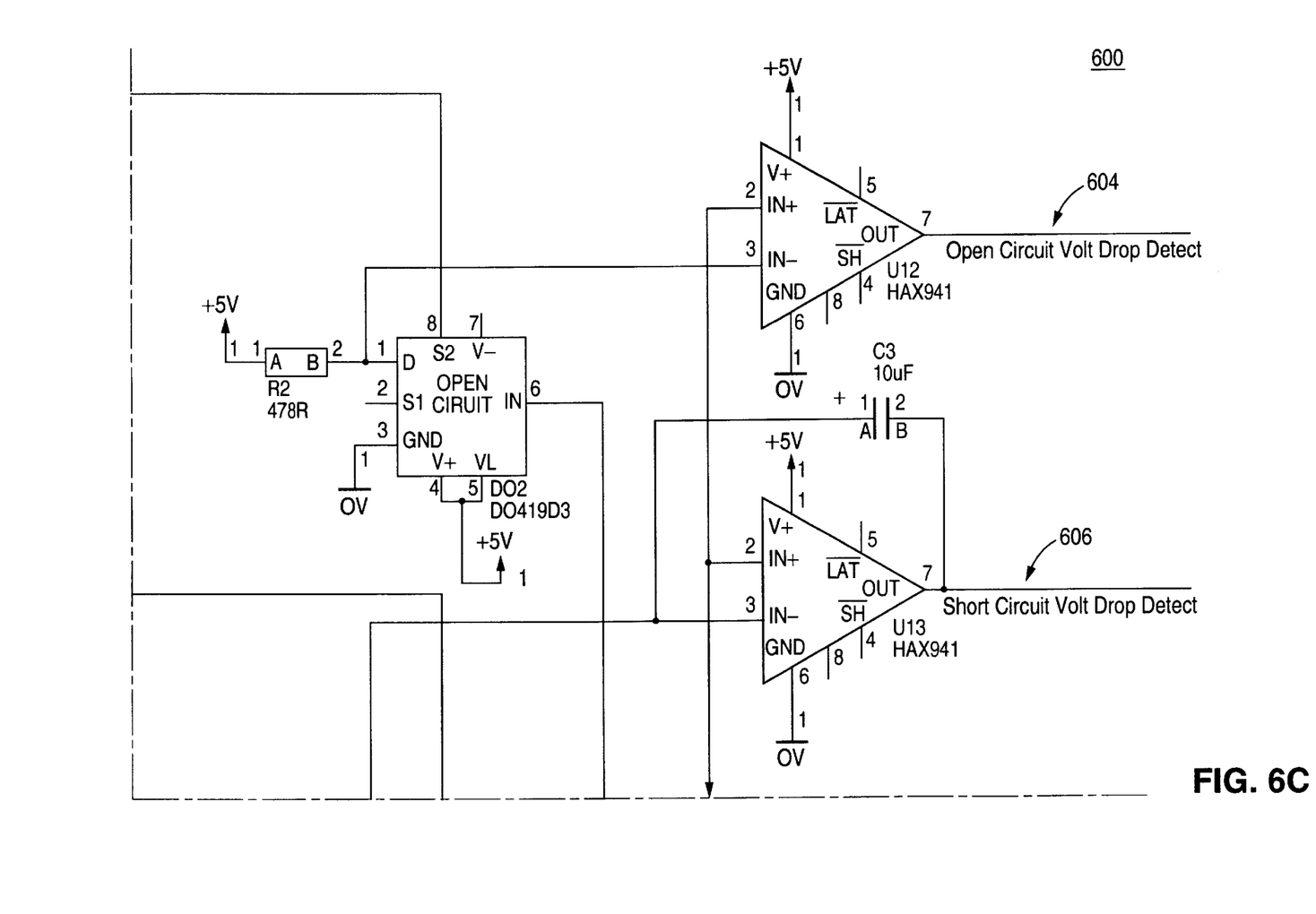
Figure 6D:
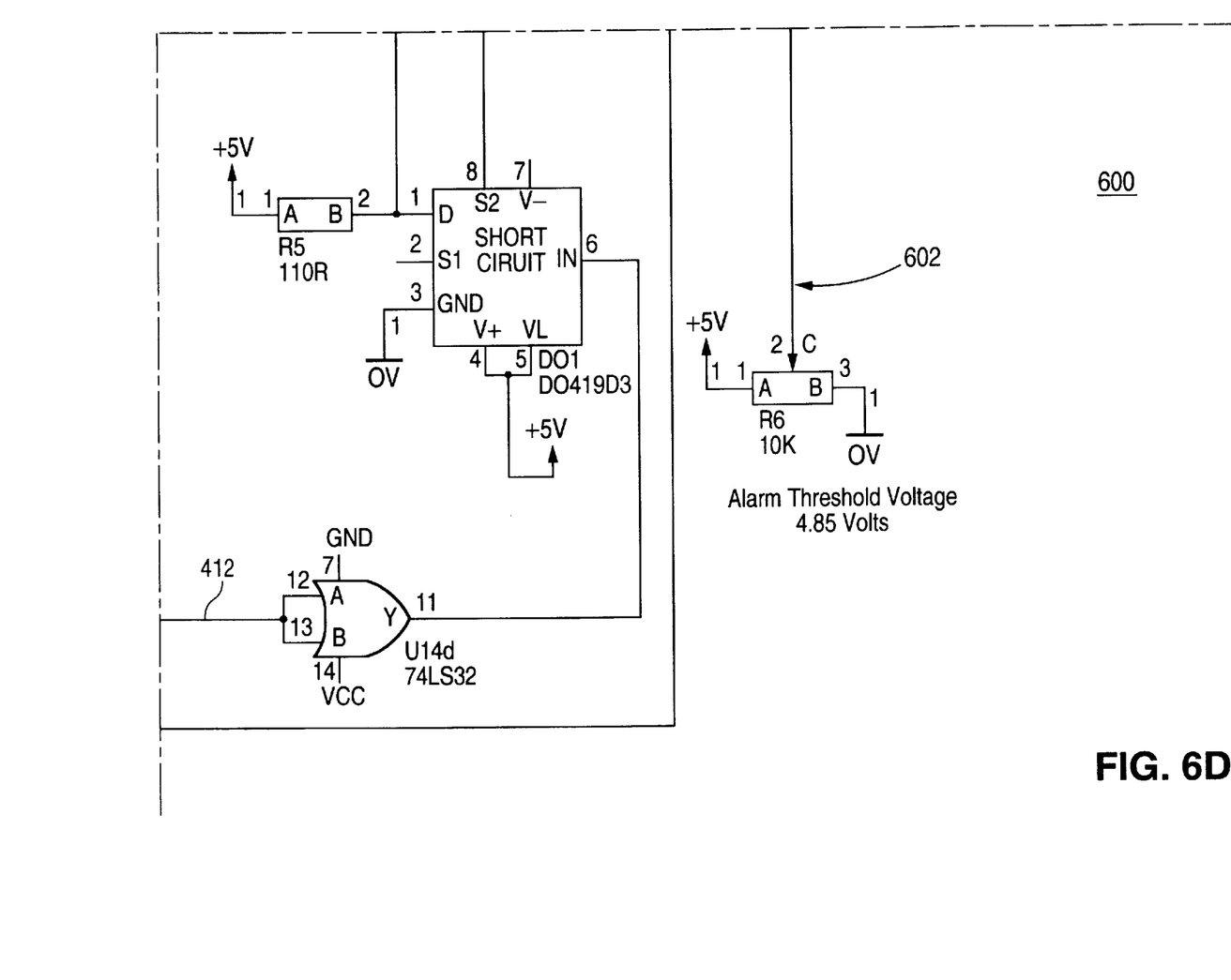

These signals from U5, U6 and U10 provide a ground connection to the common cathode of a particular bi-color LED(LED 1–10) shown in FIGS. 6A–6B, where the particular bi-color LED corresponds to the thermocouple whose voltage 402 is being input to the comparators U20 and U21.

If a fault condition is detected by the U20/U21 window comparator circuit of FIG. 4A the output signal (410 and 412) is buffered by U14a/U14d and is used to drive analog switches DG1 and DG2. If an open circuit condition is detected via signal 412 then the open circuit switch DG2 will send a driving voltage to the anodes of the of the red LEDs, and the red LED corresponding to thermocouple which is indicated as selected via the signals from the inverters U8(a–f) and U9(a–d) will be driven. Thus, the red LED, which corresponds to the failed thermnocouple, will light on the user interface 200. Similarly, when a short is detected the green LED corresponding to the failed thermocouple will be lit.

When the analog switches are enabled the voltage at pin 1 on DG1 or DG2 drops from 5 Volts to approximately 3 volts due to the voltage drop created by the current drawn through the LED. Specifically, when there is a voltage resulting from an open or short detection input to pin 6 of DG1 or DG2 a short is created between pin 1 to pin 8 which causes current to flow through the resistor R2 or R5. This voltage drop is detected by comparator circuits U12 or U13. The U12 and U13 threshold voltage 602 is set using R6.

Figure 7A:
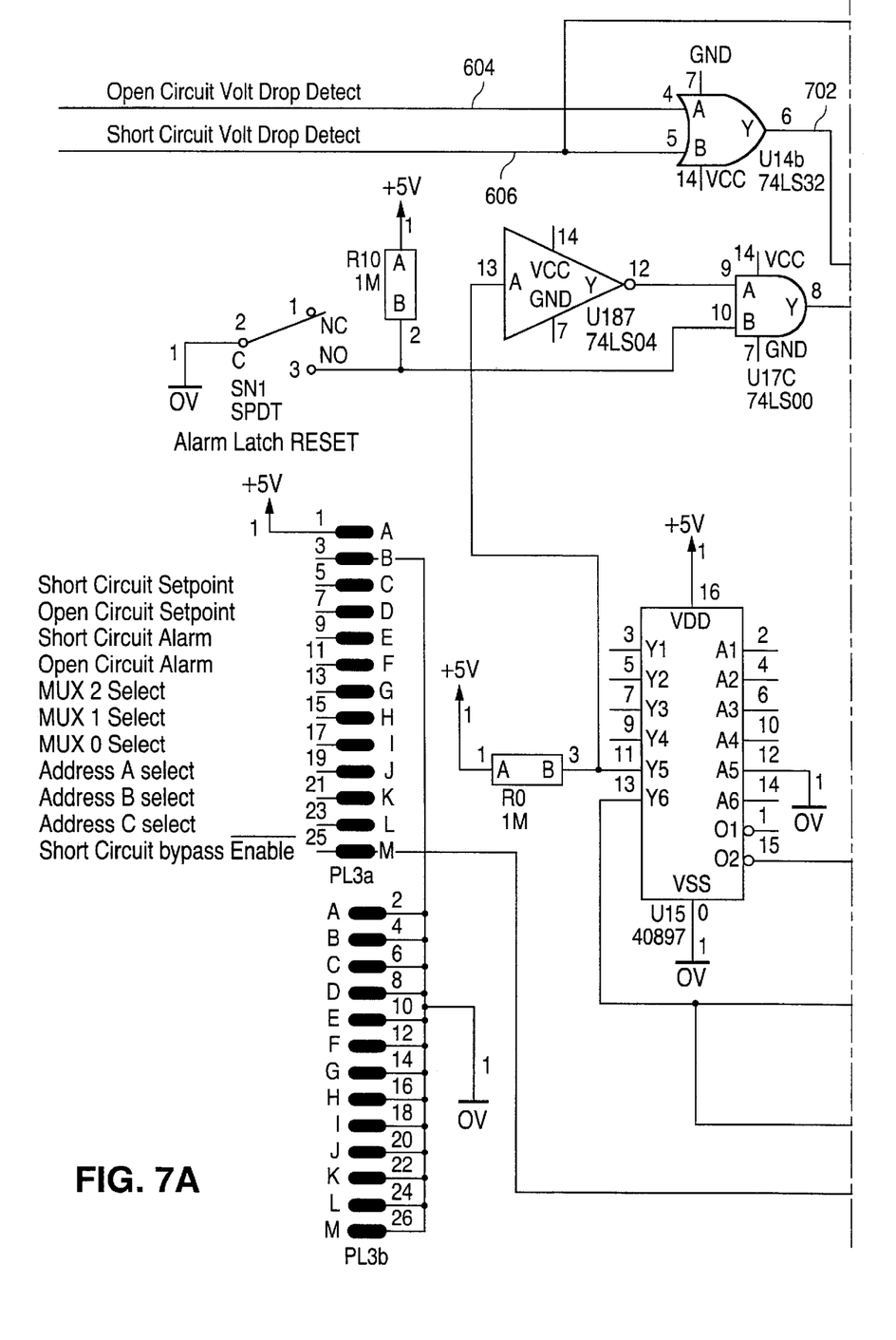
FIGS. 7A–7B are detailed schematics of a portion of the circuitry which embodies the thermocouple manager system.

The open circuit and short circuit voltage drop output signals 604 and 606 from U12 and U13 are OR'd (U14b) as shown in FIG. 7A to provide a single fault detect signal 702. This signal 702 can be used to latch the audible alarm sounder and also the Alarm LED (LED 11). This latch can be reset by pressing the alarm latch reset switch (SW1). U15 provides power for the sounder and LED via R7 and R3 pull-up resistors.

Figure 7B:
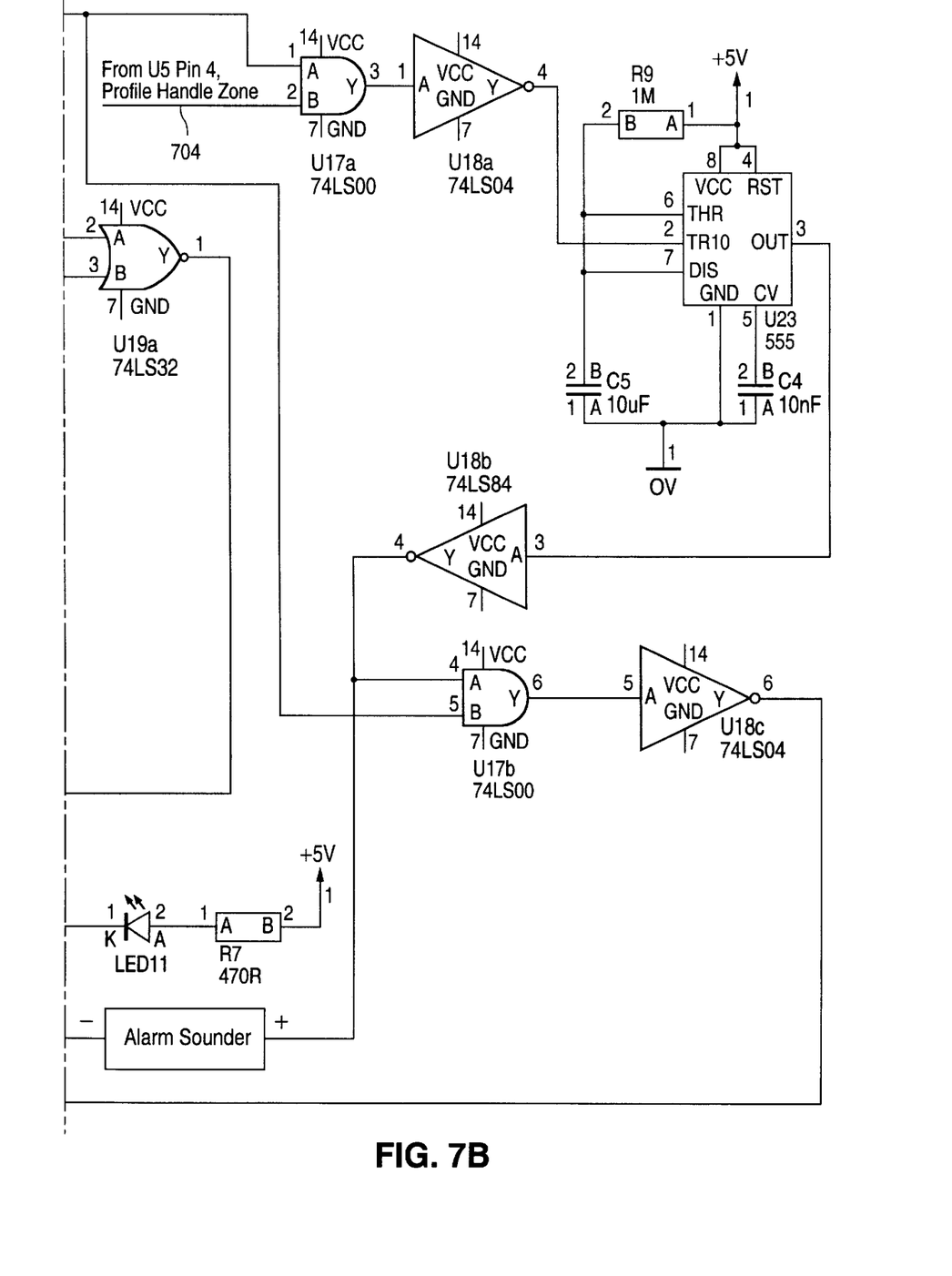

U23 and related components constitute a delay timer, having an approximately 2 minute delay, which prevents the thermocouple manager circuit from intervening when the diffusion furnace is cold at power up. This circuit uses the output 704 from the handle profile thermocouple to determine if the furnace is below 250° C. if so, the thermocouple manager system audio alarm and short circuit bypass signals are disabled allowing the furnace to reach standby temperature. Once the temperature is above 250° C. the thermocouple manager system is enabled and becomes fully operational.

The benefits of using the system and method of the present invention can be illustrated by considering different thermocouple failure scenarios. In the prior systems when the spike thermocouples are being used to control, if a spike thermocouple failed due to a short situation, the controller would cause the temperature to increase, based on the assumption that the low voltage reading at the shorted thermocouple was due to low temperature. Using the thermocouple manager system described herein, the detection circuitry will determine that the thermocouple is shorted and will cause the controller to ignore the voltage detected at the shorted thermocouple, and instead use the voltage reading from the other spike thermocouple. Additionally, the thermocouple manager system will cause the user interface to indicate exactly which thermocouple failed and the nature of the failure.

Because the thermocouple manager system is able to determine if a thermocouple has failed due to either an open or short condition, the thermocouple manager system offers the advantage of being able to identify a situation where both spike thermocouples have a short failure, and where such a situation has been identified, existing software can be utilized to cause the system to switch from spike control to profile thermocouple control. Similarly, if the system is operating under profile thermocouple control and the thermocouple system manager detects a failure due to either an open or a short then existing software can be utilized to cause the system to switch over to spike thermocouple control.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense. Further, even though only certain embodiments have been described in detail, those having ordinary skill in the art will certainly understand that many modifications are possible without departing from the teachings thereof. All such modifications are intended to be encompassed within the following claims.

What is claimed is:

1. A method for using temperature information from a semiconductor processing environment to control the operation of a heating element used to heat the processing environment, comprising:

establishing a first zone in the semiconductor processing environment having a plurality of heat sensing devices;

sensing a first signal output by a first heat sensing device of the plurality of heat sensing devices;

sensing a second signal output by a second heat sensing device of the plurality of heat sensing devices; and if the first signal indicates that the first heat sensing device has a short failure, using information from the second heat sensing device to make determinations regarding the control of the heating element.

2. The method of claim 1 further comprising, generating a control signal, if the first signal indicates that the first heat sensing device has a short failure, which causes a controller to treat the first heat sensing device as if it had open condition failure.

3. The method of claim 1 further comprising inputting the first signal from the first heat sensing device to a comparator to determine if the first heat sensing has failed.

4. The method of claim 1 further comprising inputting the first signal for the first heat sensing device into a window comparator circuit to determine if the first heat sensing has an open or short failure.

5. The method of claim 1 further comprising sending a display signal to a LED of a user interface to indicate which of the plurality of heat sensing devices has failed, if one of the plurality of heat sensing devices has failed.

6. The method of claim 1 further comprising sending a signal to a LED of a user interface to indicate which of the plurality of heat sensing devices has failed and whether the failure is an open or short failure, if one of the plurality of the heat sensing devices has failed.

7. The method of claim 1 further comprising using information from a third heat sensing device of the plurality of heat sensing devices to make determinations regarding control of the heating element if the first signal indicates that the first heat sensing device has failed, and the second signal indicates that the second heat sensing device has failed.

8. A system for using temperature information from a semiconductor processing environment to control the heat of the processing environment, comprising:

a container in which semiconductor devices are processed;

a heating element that heats the container;

a first sensing zone of the container having a plurality of heat sensing devices which generate voltages;

a first circuit that detects if one of the plurality of heat sensing devices has failed due to a short condition, and if one of the plurality of heat sensing devices has failed due to a short condition, generates a first signal; and a control circuit which controls the heating element based on voltages generated by one or more of the plurality of heat sensing devices, and wherein when the control circuit receives the first signal from the first circuit, the control circuit will not utilize a voltage generated by the one of the plurality of heat sensing devices which has failed due to a short condition as a basis for the control of the heating element.

9. The system of claim 8 wherein the first circuit includes a comparator.

10. The system of claim 8 wherein the first circuit includes a window comparator circuit.

11. The system of claim 8 further comprising:

a user interface including a plurality of LEDs which correspond to the plurality of heat sensing devices, wherein the LEDs are coupled to the first circuit such that the failure of a first heat sensing device of the plurality of heat sensing devices will drive a first LED of the plurality of LEDs to indicate the failure of the first heat sensing device.

12. The system of claim 8 further comprising:

a user interface including a plurality of bi-color LEDs which correspond to the plurality of heat sensing devices, wherein the bi-color LEDs are coupled to the first circuit such that the failure of a first heat sensing device of the plurality of heat sensing devices will drive a first bi-color LED of the plurality of bi-color LEDs such that the color emitted by the first bi-color will indicate the failure of the first heat sensing device and whether the first heat sensing device has failed due to a short or open condition.

13. The system of claim 8 wherein the plurality heat sensing devices include thermocouples.

14. The system of claim 8 wherein a plurality of voltages generated by the plurality of heat sensing devices are sequentially input to the first circuit, and wherein the system further comprises:

addressing circuitry which determines which of the plurality of voltages corresponds to a particular one of the plurality of heat sensing devices.

15. The system of claim 8 wherein the first circuit further comprises a window comparator circuit which sequentially receives a plurality of voltages generated by the plurality of heat sensing devices and compares the received voltages against a plurality of reference voltages to determine if a particular one of the plurality of heat sensing devices has failed due to an open or short condition.

16. The system of claim 8 wherein the first circuit generates a signal which causes the controller to treat a heat sensing device that has failed due to an short condition as if it had failed due to an open condition.

17. A system for using temperature information from a semiconductor processing environment to control the heat of the processing environment, comprising:

a container in which semiconductor devices are processed;

a heating element that heats the container;

a first sensing zone of the container having a plurality of thermocouples;

a window comparator circuit coupled to the plurality of thermocouples, such that it sequentially detects voltages generated by each of the plurality of thermocouples, and compares the voltages generated by each of the plurality of the thermocouples against reference voltages to determine if any of the thermocouples have failed due to an open or short condition;

a control circuit which controls the heating element based on voltages detected at one or more of the plurality of thermocouples, and when the window comparator circuit indicates that a particular thermocouple has failed, the control circuit will not use the voltage detected at the failed thermocouple as a basis for controlling the heating element; and a user interface including a plurality of LEDs which correspond to the plurality of thermocouples, wherein the LEDs are coupled to the window comparator such that the failure of a particular thermocouple of the plurality of thermocouples devices will drive a first LED of the plurality of LEDs to indicate the failure of the particular thermocouple device of the plurality of thermocouple devices.

* * * * *

UNITED STATES PATENT AND TRADEMARK OFFICE
CERTIFICATE OF CORRECTION

PATENT NO.     : 6,627,860 B1
DATED          : September 30, 2003
INVENTOR(S)    : Gary Robertson It is certified that error appears in the above-identified patent and that said Letters Patent is hereby corrected as shown below:

<u>Title page,</u>
Item [73], Assignee, please add the following:
-- [73] Assignee:  National Semiconductor Corporation, Santa Clara, CA --

Signed and Sealed this

Twenty-third Day of March, 2004

JON W. DUDAS
*Acting Director of the United States Patent and Trademark Office*